Nov. 10, 1936.  A. S. ROBINSON  2,060,427
THERMOMETER
Filed Aug. 30, 1934  2 Sheets-Sheet 1
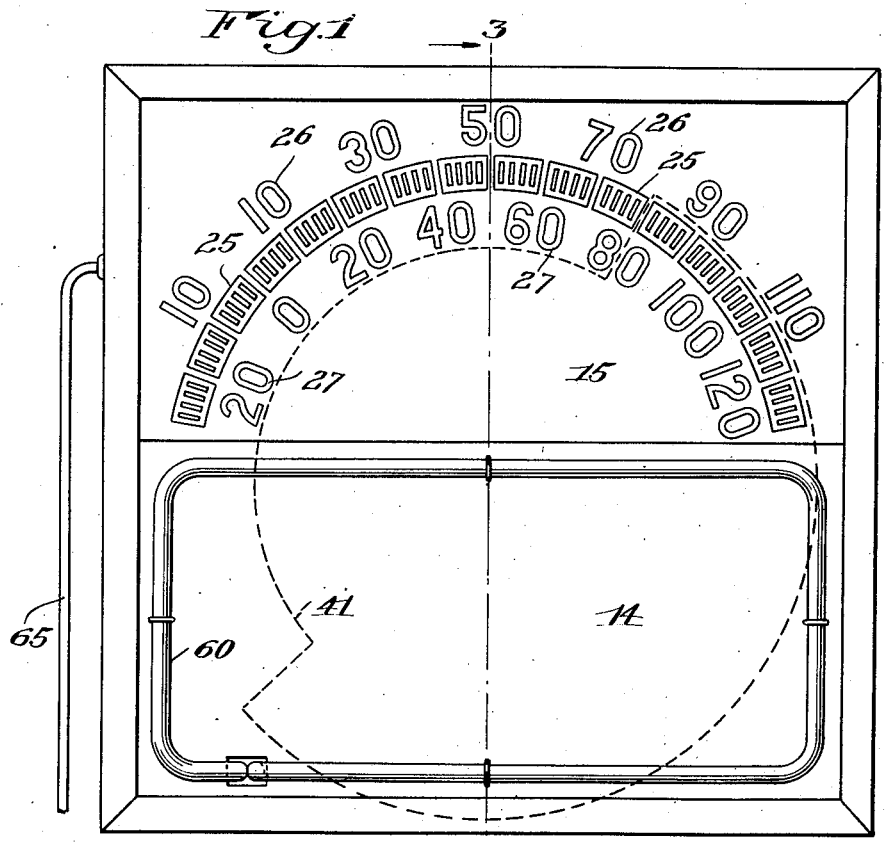
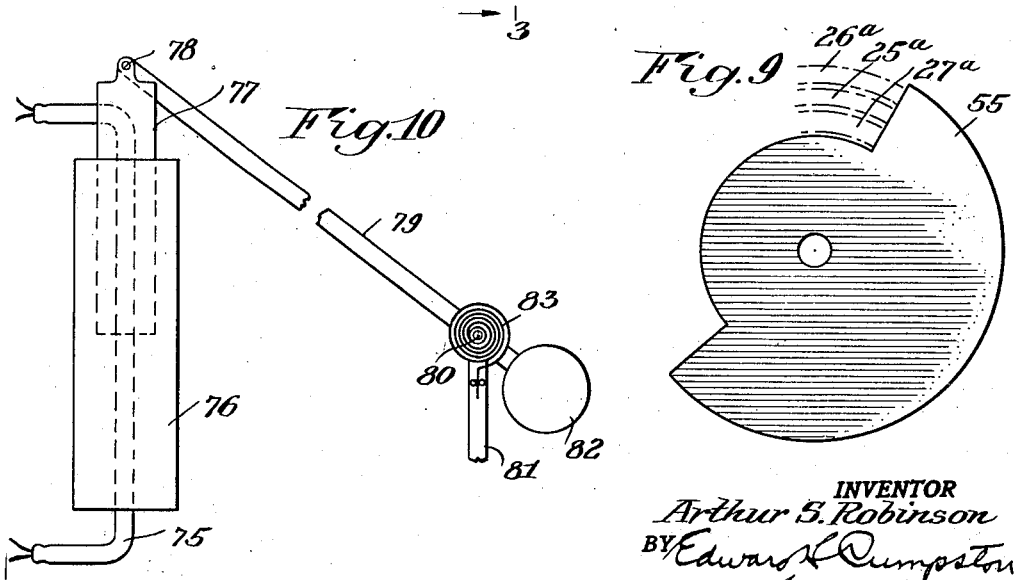
INVENTOR
Arthur S. Robinson
BY Edward L. Dumpston
his ATTORNEY Nov. 10, 1936.  A. S. ROBINSON  2,060,427
THERMOMETER
Filed Aug. 30, 1934  2 Sheets—Sheet 2
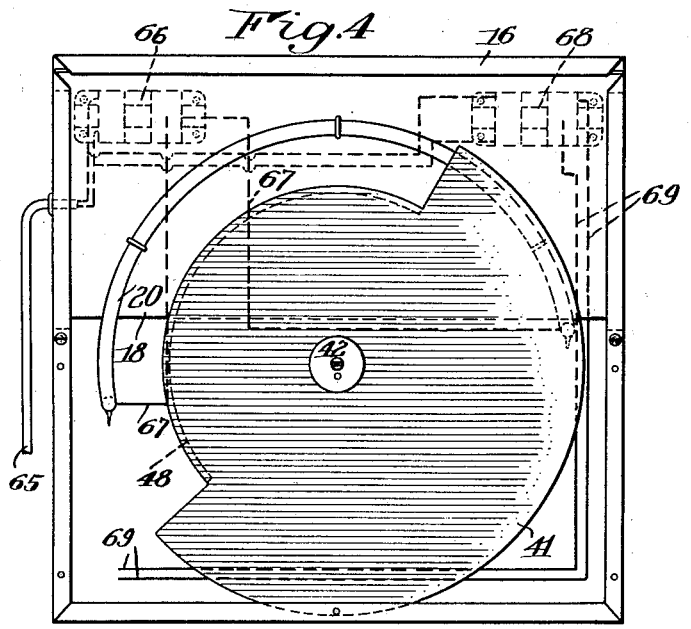
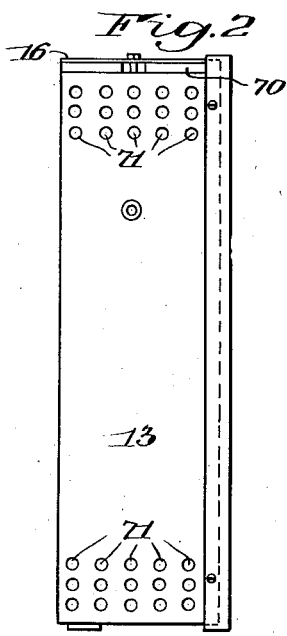
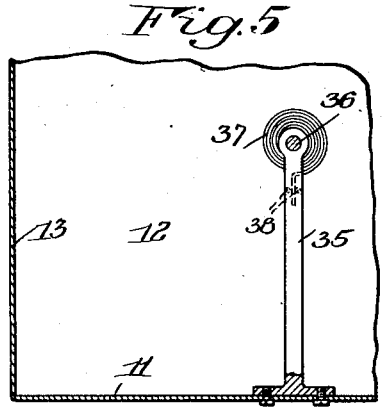
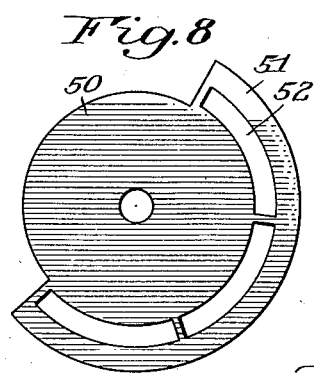
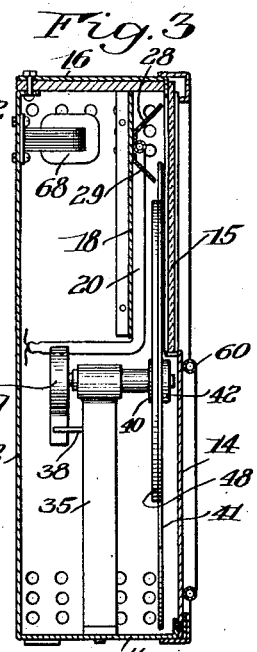
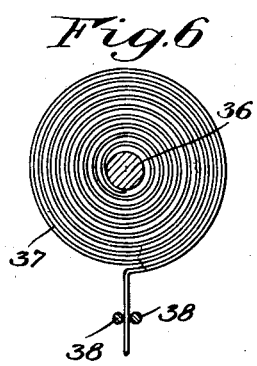
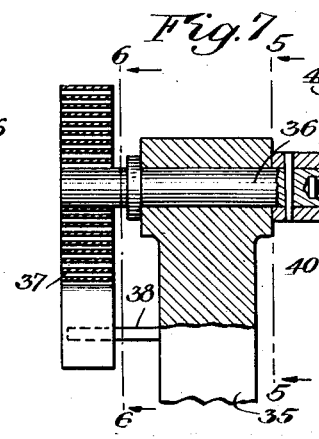
INVENTOR
Arthur S. Robinson
BY Edward H. Cumpston
his ATTORNEY Patented Nov. 10, 1936

2,060,427

UNITED STATES PATENT OFFICE 2,060,427

THERMOMETER

Arthur S. Robinson, Rochester, N. Y., assignor to Rochester Manufacturing Co., Inc., Rochester, N. Y., a corporation of New York Application August 30, 1934, Serial No. 742,129

2 Claims. (Cl. 73—118)

This invention relates to thermometers or temperature indicating devices.

An object of the invention is the provision of an improved temperature indicating device, of neat, attractive, and novel appearance.

Another object is the provision of such a device which is illuminated so that it may be read either by night or by day.

Still another object is the provision of such a device so designed and constructed that it may be made relatively inexpensively and so that its operating cost or upkeep is small.

A further object is the provision of an advertising novelty which will be of value in attracting attention to the advertisement displayed thereon.

To these and other ends the invention resides in certain improvements and combinations of parts, all as will be hereinafter more fully described, the novel features being pointed out in the claims at the end of the specification.

In the drawings:

Fig. 1 is a front view of a device constructed in accordance with a preferred embodiment of the invention;

Fig. 2 is an edge view thereof;

Fig. 3 is a vertical section therethrough, substantially on the line 3—3 of Fig. 1;

Fig. 4 is a front view of the device with the front wall and other parts removed to show the interior construction;

Fig. 5 is a vertical section substantially on the line 5—5 of Fig. 7;

Fig. 6 is a view substantially on the line 6—6 of Fig. 7;

Fig. 7 is a central vertical section through part of the mechanism;

Fig. 8 is a face view of an alternative form of shutter or screen disk;

Fig. 9 is a face view of another alternative form of shutter or screen disk, and Fig. 10 is a diagrammatic view of a slightly different form of thermometer.

The same reference numerals throughout the several views indicate the same parts.

Referring now to the preferred form of the invention illustrated in Figs. 1 to 7 inclusive, there is shown a suitable casing including, for example, a bottom wall 11, a back wall 12, end walls 13, and a front wall formed partly of a sheet metal plate 14 and partly of a glass plate 15. A top wall 16 may also be provided.

Within the casing, and behind the part 15 of the front wall thereof, is any suitable support, such as the partition 18, for holding suitable illuminating means preferably in the form of a light emitting tube 20 (such as the well known neon tube, or the like) which, as shown, is preferably in the shape of an arc of a circle.

Suitable graduated scale means is provided on the portion 15 of the front wall of the device. In the embodiment here shown, the graduated scale means is arranged in three lines, a middle line 25 of scale markings or graduations, an upper line 26 of identifying numerals associated with the scale markings, and a lower line 27 of identifying numerals also associated with the scale markings. These three lines are preferably of concentric arcuate form corresponding generally to the curvature of the tube 20, and one or another of the lines is preferably substantially alined with the tube. For example, the middle line of graduations 25 may be in alinement with the tube 20, and reflectors may be provided, such as the reflector 28 (Fig. 3) of frusto-conical form concentric with and above the tube 20, and the reflector 29 of frusto-conical form concentric with and below the tube 20, for reflecting light from the tube to the upper and lower lines of the graduations 26 and 27, respectively.

The graduations themselves may be of any suitable form or kind, contrasting with the background on which they are placed. Preferably either the graduations or their background are of light transmitting character. For example, the graduations may be opaque and the background transparent, or the graduations may be transparent and the background opaque. It is usually preferred, however, to have the graduations (both the scale markings 25 and the numerals 26 and 27) transparent, or at least light transmitting, and to have the background opaque. This may be accomplished, for example, by covering the major portion of the glass plate 15 with black paint or any other suitable opaque substance, leaving the graduations uncovered so that they will form transparent or translucent portions of an otherwise opaque or materially less transparent wall.

Within the casing is a suitable support, such as the bracket or standard 35, in which is rotatably mounted a shaft 36 concentric with the arcs of the tube 20 and the graduations 25, 26, and 27. This shaft is suitably connected to one end of a temperature responsive device, such as the coiled bi-metallic thermostatic element 37, the other end of which is suitably held in fixed position as by being inserted between two fixed pins 38 on the standard 35. As the temperature rises or falls, the temperature responsive device 37 will, in known manner, change its shape, which will cause rotation of the shaft 36 in one direction or the other.

The shaft 36 is also provided with a hub or boss 40 pinned or otherwise securely fixed to the shaft, on which a shutter disk or screen member 41 is mounted and against which it may be securely clamped by means of a member 42 held in place by a screw 43. By loosening the screw 43, the disk 41 can be turned with reference to the shaft 36, for purposes of adjustment and calibration. For the purpose of aiding in such adjustment, one of the members 40 or 42 is provided with a pin 44 projecting into a hole in the other member, to prevent relative rotation of the members 40 and 42 even when the screw 43 is loosened. Thus by loosening the screw 43, the disk 41 is loosened so that its position may be shifted, but by grasping the member 42 which is conveniently accessible at the front of the disk 41, one may easily hold the parts 42, 40, and 36 against rotation and thus bring the disk 41 into exactly the position desired with reference to the shaft 36, after which the screw 43 may be again tightened.

The shutter or screen disk 41 has different portions on its periphery of different diameters, as plainly shown in Figs. 1 and 4. The portion of smaller diameter is of slightly less diameter than the innermost line of graduations 27, while the portion of larger diameter is of a diameter to overlap one or more of the lines of graduations, and there is an abrupt radial step between the two portions, as shown. The disk lies preferably on the rear side of the wall 15 carrying the graduations, so that it will intercept part of the light from the tube 20 which would otherwise reach the graduations. A flange 48 on the part of the disk of smaller diameter acts as a counterweight to counterbalance the extra weight of the part of the disk of larger diameter, so that gravity will not tend to turn the disk in either direction.

In the form shown in Figs. 1 and 4, the larger diameter part of the shutter disk overlaps the middle line 25 of graduations and the lower line 27, but not the upper or outer line 26. Thus, when the device is in operation, light will shine at all times through the transparent or translucent graduations 26, but light will shine through the other graduations 25 and 27 only to the extent permitted by the position to which the disk 41 is rotated. The disk is so set on its shaft 36, of course, that the dividing line between the smaller diameter part of the disk and the larger diameter part of the disk corresponds at all times to the temperature. As the temperature rises, the thermostatic element 37 turns the shaft 36 and the disk 41 in a clockwise direction when viewed as in Figs. 1 and 4, so that a greater portion of the graduations 25 become unmasked and visible, and a higher indication of temperature is seen by an observer. When the temperature falls, the thermostatic element 37 turns the shaft 36 and disk 41 in a counterclockwise direction, so that less of the graduations 25 are visible and a lower temperature indication is given to the observer. The spacing of the various graduations is, of course, properly calibrated with the physical characteristics of the thermostatic element 37, so that the device indicates temperature accurately in degrees at all times.

Instead of having the disk shaped as shown in Figs. 1 and 4, with the outer line 26 of graduations visible at all times and the inner and middle lines obscured in part by the shutter disk, it is possible to construct the disk in various other ways. For example, as shown in Fig. 8, the disk 50 has a portion 51 in alinement with the middle line 25 of graduations, and has openings 52 through which light may shine at all times onto the inner line 27 of graduations, and light may at all times shine also on the outer line 26 of graduations without interference from the shutter 50. When a shutter of this form is used, both the inner and outer lines 26 and 27 are visible at all times, and the temperature is read by noting the point at which the illumination of the graduations 25 ceases.

Again, as in Fig. 9, the shutter 55 may be constructed so that its part of larger diameter overlies all three of the lines of graduations indicated diagrammatically at 26a, 25a, and 27a in this figure. Thus, all three lines of graduations will be dark or obscured in positions higher than the indicated temperature, while all three lines will be light and visible in positions lower than the indicated temperature.

The device thus far described provides a thermometer of novel appearance, visible alike by day and by night, and attracts considerable attention. The continuous band of light (usually a brightly colored light) visible from the lowest graduation up to the temperature to be indicated, is unusual and pleasing, so that passers-by will stop to look at it. Other features may be added, however, to make the device still more of an advertising novelty. For example, another light emitting tube 60 (such as a neon tube, or the like) may be placed on the front of the lower part 14 of the front wall of the casing and formed into a rectangular outline or any other suitable shape. Advertising matter of any desired kind may be placed within the outline of the tube 60, to be illuminated by the light from the tube and to have attention directed thereto by the tube. If desired, the light emitted by the tube 60 may be of a different color from that emitted by the tube 20, one being, for example, a green tube, and the other being, for example, a red or orange tube.

Electric current is supplied to the device for lighting the tubes, through any suitable extension cord or lead-in wire 65, which is connected to a transformer 66 having leads 67 leading to the tube 20, and current may also be supplied to another transformer 68 having leads 69 leading to the tube 60.

The casing itself may be provided with suitable vent holes or openings 70 and 71 (Fig. 2) so that air may pass freely into and out of the casing in order to keep the interior of the casing at the same temperature as the exterior air, the temperature of which is to be indicated. If preferred, the device may be made so that the temperature responsive element 37 is outside of the casing itself.

While the preferred form of construction, as above described, embodies a rotatable shutter or screen disk and an arcuate illuminating tube, it is not necessary that the parts be of this form. For example, as shown diagrammatically in Fig. 10, a straight neon tube 75, arranged vertically or otherwise, may be provided, in front of which is placed a plate 76 having the desired graduated scale thereon. Between the tube 75 and the plate 76 is a shutter or screen member 77 operatively connected at 78 to an arm 79 which is pivoted at 80 to a standard 81 and which has a counterweight 82 on the opposite side of the pivot from the shutter 77. The position of this arm is controlled by a heat responsive device 83 which may be similar to or substantially identical with the thermostatic element 37 previously described. As the temperature rises and falls, the heat responsive element 83 will cause the arm 79 to move up and down, which will cause corresponding movement of the shutter 77, which, in turn, will intercept more or less of the light which would otherwise shine from the tube 75 upon the graduated scale means indicated diagrammatically at 76.

The shutter 77 should, of course, be wide enough so that as the arm 79 swings up and down, the resulting sidewise displacement of the shutter will not cause it to expose some of the graduations which should not be exposed. Or, instead of making the shutter 77 relatively wide, it can be held against lateral movement by suitable guides and connected to the arm 79 by a pin and slot connection.

In both forms of the invention, it is seen that the illuminating means provides a continuous band or streak of light, and that the disk or screen, placed between this continuous streak of light and the eye of the observer, intercepts more or less of the light, depending on the temperature, and thus indicates to the observer, by the position of the end of the visible streak of light, the temperature which is influencing the thermostatic element.

While certain embodiments have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Temperature indicating means comprising a light emitting tube, an arm pivotally mounted for partial rotation, temperature responsive means for moving said arm, and screen means carried by and movable with said arm, said screen means having a portion substantially in alinement with said tube to obscure a portion of the length of said tube variable in accordance with movement imparted to said screen means, while leaving light from another variable length of said tube visible.

2. Means for indicating a variable quantity, comprising a light emitting tube providing a substantially continuous band of light, opaque shielding means movable in response to variations in the quantity to be indicated, for masking a variable part of said band of light while leaving visible a length thereof variable in accordance with said variable quantity, and graduated scale means associated with said band of light so that the variable visible length of said band of light may be readily observed in conjunction with said scale means.

ARTHUR S. ROBINSON.